Figure 1:
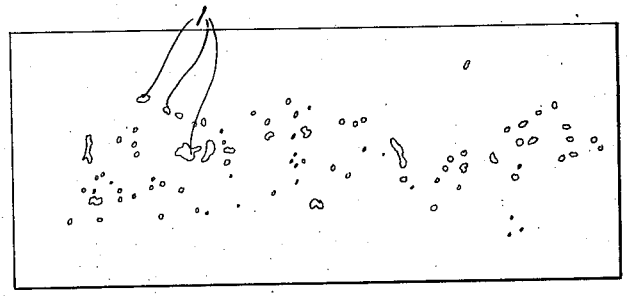

April 8, 1930.   K. PITSCHNER   1,753,301

TESTING METALLIC COATINGS

Original Filed Dec. 22, 1926

INVENTOR
Karl Pitschner.
BY
Frederick P. Duncan, ATTORNEY

Patented Apr. 8, 1930

1,753,301

UNITED STATES PATENT OFFICE

KARL PITSCHNER, OF BRIDGEPORT, CONNECTICUT, ASSIGNOR TO AMERICAN CHAIN COMPANY, INC., A CORPORATION OF NEW YORK

TESTING METALLIC COATINGS

Application filed December 22, 1926, Serial No. 156,510. Renewed May 16, 1928.

This invention relates to methods and means of detecting the presence and location of minute holes in material in thin sheet form such as metal plating, paint and similar adherent coatings and foil. The process involves the application of the thin sheet to a base of a different material and utilizes the fact that certain substances are characterized by a chemical reaction on the base which differs from their chemical reaction on the sheet to be tested. The process finds its greatest utility in testing thin sheet metal or metal plating which is adherent to its base, such as electro-plating, but can be used as well for testing non-adherent sheets; the base in this instance serving merely to produce the desired difference in reaction. In the commerical aspect the process and method are most useful in testing nickel plating on ferrous or copper bases, and the specific means and process which I herein describe as illustrative of the invention, are confined to their application for that purpose. It is to be understood, however, that the full scope of the invention is to be determined from the appended claims.

It is well known that much difficulty is experienced in metal plating, especially nickel plating on ferrous bases by reason of the fact that the plating, even in spite of extreme care, frequently contains a considerable number of minute holes, through which minute areas of the base are exposed. As is well known, the exposure of these minute areas of the base, particularly a ferrous base, results in corrosion in the vicinity of each hole which gradually spreads, resulting not only in an unsightly appearance of the product, but in defeating the object of the plating. These minute holes are not visible with the unaided eye, and are with difficulty detected with a microscope. From the industrial standpoint, therefore, some rapid factory method is needed, both for detecting the general efficiency of particular processes carried out, and also for the elimination of defective products. It is the principal object of my invention to supply the need last mentioned, and in a manner non-destructive to the article tested.

A more limited object is a method and means of applying to the pieces to be tested, the chemical reagent above referred to. A still further object is to provide a vehicle for carrying the chemical reagent which is in a convenient form, whereby tests may be carried out with great rapidity. Another object is a process and means of carrying out the broad objects of the invention in such manner that a legible, and if desired, a permanent record of the test may be made.

A clear conception of the solution used, the process and objects of the process may be had from the following specification, in conjunction with the accompanying drawing, in which, Fig. 1 shows a strip of paper giving indications of pin holes through nickel over a ferrous metal.

Figure 2:
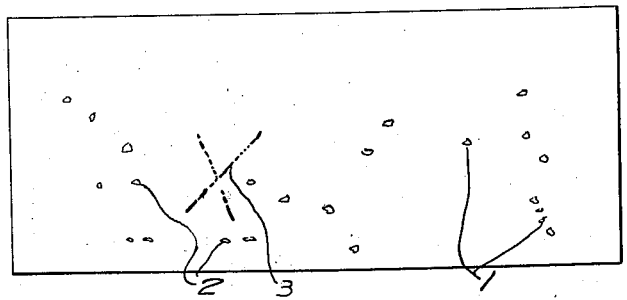

Fig. 2 shows a strip of paper giving indications of pin holes through nickel over copper over a ferrous metal.

In order to illustrate the process of testing metal sheets on a base of a different character, the specific use will be described in connection with nickel electroplated on a ferrous or copper base.

The test is performed by applying a strip of treated paper to the surface of the metal to be tested after it has been thoroughly cleaned, and the paper wet with pure water. The paper may be of any common stock suitable to retain the solution.

A suitable solution may consist of 30 grams of agar-agar stirred into one liter of cold distilled water and brought to a boil with constant stirring. After removing this solution from the heat, 60 grams of sodium chloride, and 6 grams of potassium ferri cyanide are added. After these are dissolved 250 cubic centimeters of ethyl, methyl or a good grade of denatured alcohol are added to the solution. This solution is termed a ferroxyl solution due to its oxidizing effect on ferrous metals. When allowed to cool, this solution forms a jelly-like substance. This reagent can be kept without deterioration if not exposed to a strong light or the air. Before using, the bottle containing the solution should be immersed in a hot bath to soften the jelly. The reagent is then applied to one side of a sheet of good white paper in such a way that an even coating is obtained.

The solution may be applied to the paper in any well-known manner but the preferred form is to spray the solution on the paper and then spread it with a brush having its bristles set in rubber with no iron exposed.

The surface of the metal to be tested is now cleansed free from grease, dirt or other foreign substances. The test paper is then moistened on the treated side with pure water, and spread over the surface. The location of all holes and scratches extending from the surface through to the ferrous metal base are made visible to the eye by a coloration of the paper directly over the hole within a short period of time, said coloration spreading sufficiently so that the presence and location of even the smallest of pin holes is recorded.

A test sheet of this character is shown in Fig. 1, the paper having a blue tint with the pock-marked indications 1 showing in a deeper shade.

In the cases where copper is first plated on a ferrous base and then a nickel plate deposited on the copper, pin holes and scratches through to the copper only will be indicated by a brownish red spot, and at the same time pin holes and scratches through to the ferrous base will be shown by a deep blue spot on the same paper.

A test sheet of this character is shown in Fig. 2, the marks 1 being of a deep blue indicating a hole through to the ferrous metal, and marks 2 being of a reddish brown color indicating the scratches or holes through to the copper. The cross mark 3 is a scratch made through the nickel to the copper to indicate the operation of the test.

The tests slips may be made a permanent record by painting immediately after the tests with a thin coating of clear shellac, thereby protecting the surface from action by light and abrasion.

It is also apparent that this process may be used for testing coatings of paint on metal bases or the detection of pin holes in metal foil, the foil being placed on a bed of pure metal with which the solution has a chemical action and will give an obvious indication on the test slip.

It is also obvious that the indications on the test slips do not necessarily have to be immediately visible but may be developed by a developing solution which has an action on the deposits thereby making the indications visible.

I claim:—

1. A process of detecting the presence of minute holes in material in sheet form on a base of different material, which comprises applying to said sheet a strip of material carrying a substance characterized by a chemical reaction on said base distinguishable from its reaction on said sheet, said substance acting through said holes to produce on said strip a change which differentiates the area thereof covering and surrounding said holes from the remaining area thereof, thereby forming a legible record of the presence of said holes.

2. A process of detecting the presence of minute holes in materials in sheet form on a base of different material, which consists in applying to said sheet a strip of material carrying a substance characterized by a chemical reaction on said base distinguishable from its reaction on said sheet, allowing said sheet to remain until said substance acting through said minute holes has produced on said strip a change which differentiates the area covering and surrounding said holes from the remaining area of said strip, thereby forming on said strip after having been removed from said sheet, a legible record of the presence of said holes.

3. A process of detecting the presence of minute holes in nickel plated on a ferrous base, which comprises applying to said sheet a strip of material carrying a substance characterized by a chemical reaction on said base distinguishable from its reaction on said nickel, said substance acting through said holes to produce on said strip a change which differentiates the area thereof covering and surrounding said holes from the remaining area thereof, thereby forming a legible record of the presence of said holes.

4. A process of detecting the presence of minute holes in a sheet of copper plated on a ferrous base, and a second sheet of nickel plated on said copper which comprises applying to said outer sheet a strip of material carrying a substance characterized by a chemical reaction on said base distinguishable from its reaction on said sheets, said substance acting through said holes to produce on said strip a change which differentiates the area thereof, covering and surrounding said holes in said nickel from those in said copper and from the remaining area thereof, thereby forming a legible record of the presence of said holes in both sheets.

5. A process of detecting the presence of minute holes in nickel plated on a ferrous base, which comprises applying to said sheet a strip of material carrying a ferroxyl solution, said solution being characterized by a chemical reaction on said base distinguishable from its reaction on said nickel, said solution acting through said holes to produce on said strip a change which differentiates the area thereof covering and surrounding said holes from the remaining area thereof, thereby forming a legible record of the presence of said holes.

6. A process of detecting the presence of minute holes in a sheet of copper plated on a ferrous base, and a second sheet of nickel plated on said copper which comprises applying to said outer sheet a strip of material carrying a ferroxyl solution, said solution being characterized by a chemical reaction on said base distinguishable from its reaction on said sheets, said solution acting through said holes to produce on said strip a change after said strip has been removed from said sheet which differentiates the area thereof covering and surrounding said holes in said nickel from those in said copper and from the remaining areas thereof, thereby forming a legible record of the presence of said holes in both sheets.

7. A process of detecting the presence of minute holes in material in sheet form on a base of different material which comprises applying to said sheet a strip of paper carrying a ferroxyl solution, said solution being characterized by a chemical reaction on said base distinguishable from its reaction on said sheet, said solution acting through said minute holes to produce on said strip a change which differentiates the area covering and surrounding said holes from the remaining area of said strip, thereby forming a legible record of the presence of said holes, said ferroxyl solution comprising, in their correct proportions, parts of agar-agar, water, sodium chloride and potassium ferri cyanide, dissolved in ethyl alcohol.

8. A process of detecting the presence of minute holes in material in sheet form on a base of different material, which comprises applying to said sheet a strip of material carrying a substance characterized by a chemical reaction on said base distinguishable from its reaction on said sheet, said substance acting through said holes to produce on said strip a change which differentiates the area thereof, covering and surrounding said holes from the remaining area thereof, thereby forming a legible record of the presence of said holes, and a permanent record when said strip has been given a coating of clear shellac after having been removed from said sheet.

9. A process of producing a record of the presence of holes in material in sheet form on a base of different material which comprises applying to said sheet a vehicle detachable therefrom and carrying a substance reactive to one of said materials.

10. A process of producing a record of the presence of minute holes in material in sheet form on a base of a different material which comprises applying to said sheet a vehicle detachable therefrom and carrying a substance differentially reactive to said materials respectively.

11. A process of detecting the presence of minute holes in material in sheet form on a base of different material which comprises applying to said sheet a vehicle detachable therefrom and carrying a substance reactive to the base material whereby such reaction will produce a record on said vehicle of the presence and approximate area of said holes.

12. A process of detecting the presence of minute holes in material in sheet form on a base of different material which comprises applying to said sheet a vehicle detachable therefrom and carrying a substance differentially reactive to the sheet and the base whereby such reaction with the base through the holes will be distinguishable from that with the sheet, thereby producing a record of the presence and approximate area of said holes.

13. A process of detecting uncoated areas of a base provided with a coating which comprises applying to the coated surface of the base a vehicle detachable therefrom and carrying a substance reactive to the base and such reaction with the base being distinguishable from that with the coating whereby a record will be produced of the presence and approximate extent of the uncoated areas of the base.

In testimony whereof, I have signed this specification.

KARL PITSCHNER.